INVENTOR.
Ronald F. Plambeck and
Richard F. Mandock
BY
Attorney

United States Patent Office 3,526,817
Patented Sept. 1, 1970

3,526,817
MAGNETIC AMPLIFIER BIAS FOR THREE-PHASE MOTOR CONTROL
Ronald F. Plambeck, Chicago, and Richard F. Mandock, Schiller Park, Ill., assignors to Protection Controls, Inc., Skokie, Ill., a corporation of Illinois
Filed July 15, 1968, Ser. No. 744,833
Int. Cl. H02p 7/62
U.S. Cl. 318—227                    8 Claims

ABSTRACT OF THE DISCLOSURE

The disclosure provides a simplified and compact condition-controlled biasing system in the form of a potentiometer reversely driven at a slow rate by a servo-motor which in turn is controlled by a condition-responsive (e.g. pressure-sensing) switch means which can reverse the motor or stop it for the purpose of applying a common bias current to all of the bias windings of several magnetic amplifiers which fire solid-state gating devices (e.g. silicon controlled rectifiers or triacs) in each of the phase legs of a multiphase working motor at a particular angular position in each phase of the cycle whereby to regulate the motor torque or speed in response to varying load conditions, for example pressure changes in a liquid delivery line wherein it is required to maintain a given pressure, the control system being such that each corrective operation (to slow or speed up the working motor) when completed leaves the potentiometer wiper at rest until the next corrective signal is received, so that excessive hunting and overshooting, such as is common in null type control systems, is eliminated along with rapid wearing of the potentiometer resistance elements.

---

The disclosed control system is effective in regulating the speed of a multiphase motor to maintain a desired pressure in a pumping line within very close limits in a fluid delivery circuit such, for example, as might be employed in filling containers precisely under control of automatic measuring means. In such an application the pressure at which the fluid is delivered cannot be permitted to vary significantly from a critical value if the measuring apparatus is to function accurately. Variable factors in such an application may be the head pressure behind the liquid, or changes in its viscosity, and so-on.

It is known in the art to employ solid state gating and switching means utilizing such devices as the silicon controlled rectifier (SCR) to control the current flow in each winding leg of a three-phase motor in conjunction with magnetic amplifier means having a control winding to which a bias voltage is applied to "fire" the amplifier and gate or trigger an associated SCR in a certain angular position in each phase. Control units for such purposes are commercially available and capable of producing very accurate and dependable firing or triggering pulses in either half-wave or full-wave configurations. Such magnetic amplifiers commonly include solid state pulse amplifying, shaping, hardening and restoring circuitry to achieve an ideal or particular form of trigger pulse.

In control units of the type described, it is usual to employ a magnetic amplifier in the form of a transformer having a saturable core structure and a control winding through which direct current is passed in varied magnitude to change the degree of saturation of such core, whereby an alternating current voltage acting in another winding of the transformer is permitted to induce a firing voltage in an output winding to produce the triggering pulse in required critical parameters such as shape, rise time, and amplitude, it being thus the character of such magnetic amplifier control systems that the bias voltage exerts its firing effect in each cycle as a function of the amplitude of the bias current existing at a particular angular time in each cycle.

It is the principal purpose of the present disclosure to provide a simple, direct-acting biasing means for a multiphase motor utilizing solid state gating or switching means such as an SCR in conjunction with magnetic amplifiers, wherein a single source of direct current is varied in accordance with a control condition, such as pressure, to energize the bias windings of an entire set of magnetic amplifiers comprising the array necessary to control a three-phase motor.

It is a further object to vary the D.C. biasing current by means of a potentiometer driven reversely at a slow rate by a reversing servo-motor under control of a sensing means, such as a pressure responsive switch operable to stop the motor or energize it for either direction of rotation in conjunction with switching means which in effect directionally opens and closes the servo-motor circuit so that the potentiometer contact does not oscillate in an approach to a null condition, as is the common practice with bridge types of motor control system of the class described, but, instead starts the motor at whatever position the potentiometer contact has last occupied. In this manner, wear on the potentiometer resistance element and other troubles, including excessive hunting and overshooting in restoring the predetermined pressure condition, are eliminated, and it is possible to control a 15 horsepower three-phase motor with a single potentiometer operating intermittently as distinguished from more or less continually, as in the null type systems, and handling only a few milliwatts of power to bias the magnetic amplifiers simultaneously for all three phases.

An illustrative application of the bias control means is depicted in the annexed drawing, wherein.

Figure 1:
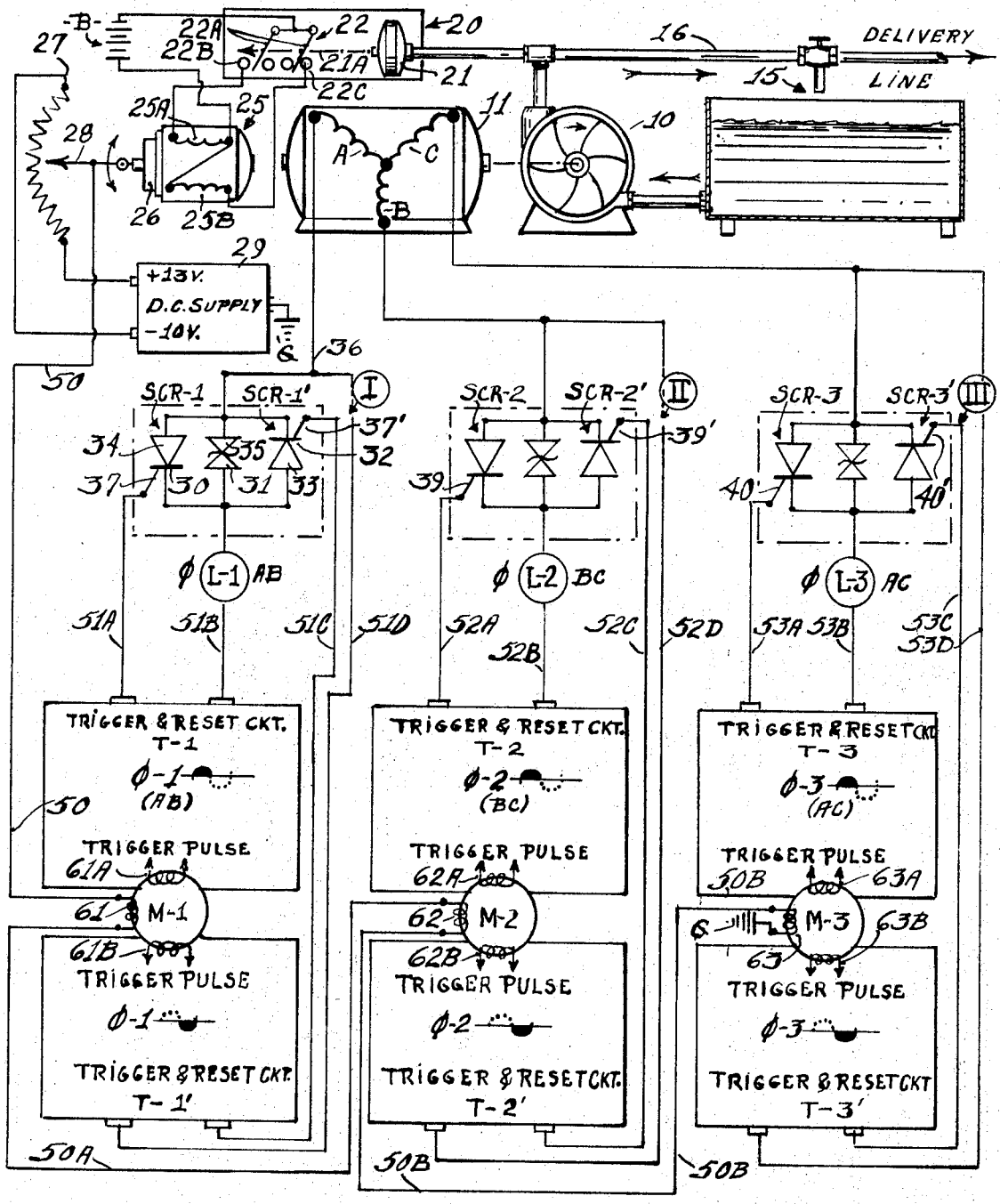
FIG. 1 is a circuit diagram for a three-phase motor control system operating in the open Y-configuration under control of solid state switching means of the type of silicon controlled rectifiers, and magnetic amplifiers "angularly timed" by the novel bias control means.

Referring to the diagram of FIG. 1, a liquid pump 10 is driven by a three-phase motor 11 which may have any desired configuration of phase winding, the Y-type being shown, said motor having windings connectible to three-phase line terminals L-1, L-2, L-3, and the winding legs being designated A, B and C, so that the phasal energizations thereof will involve, in each cycle, windings AB, BC and AC, corresponding to the phase voltages at terminals L-1/L-2; L-2/L-3; and L-1/L-3.

The pump is intended, for illustrative purposes, to extract liquid (for instance milk or some other beverage) from a supply reservoir 15 and deliver it into a feed line 16 in which a predetermined pressure is to be maintained, for example to supply the liquid at a given pressure to automatic container-filling apparatus (not shown). Pressure variations in such a supply line due, for example, to changes in viscosity or for any other reason, alter the load on the pump and reflect in overfilling or underfilling of the container. It is to be understood, however, that the control system is not limited in application to pumping operations but may be used in conjunction with any constant speed or constant torque application in which load variations can be sensed and utilized as control factors in the manner herein disclosed.

A sensing means 20, which in this illustration may comprise a device 21 responding to fluid pressure changes to actuate a switch means 22 connected in a circuit, such as shown, to reverse the operation of a small servo-motor 25 operating on a 6-volt D.C. supply and reversely driving a potentiometer 27 in conjunction with source of D.C. bias voltage 29 and other control instrumentalities hereinafter described, determines the angular time at which each of the phase winding legs of the main driving or working motor will be energized in each cycle, either in phase, or earlier or later, depending upon whether the sensing means requires an increase or decrease in motor speed or torque.

The energizing current for each motor winding leg is gated or switch on and off by triggerable or gated solid-state electron-flow switch devices such, for example, as a silicon controlled rectifier (SCR) having an anode and a cathode conduction path and a gating or triggering electrode to which a control voltage pulse is applied to switch or fire the anode-cathode current path into the conductive state.

In FIG. 1, each of the phase windings A, B and C is provided with a full-wave switching means generally indicated at I, II and III, respectively, each including two reversely-conducting SCR's and a solid-state suppressing means of the Zener type as a surge-protective means, the three units being identical so that the description of one suffices for all.

Referring to unit I, one line terminal L–1 ($\varphi$–1,AB) is connected to the cathode 30 of SCR–1, an anode 31 of the suppressor, and the anode 33 of the companion SCR–1', while the anode 34 of SCR–1, the second anode 35 of the suppressor, and the cathode 32 of the companion SCR–1' connect via conductor 36 to the motor winding A. Thus, when either of the pairs of SCR's is conductive or fired, the corresponding phase leg AB of the motor will be energized during the permitted portion of both halves of the cycle by such pair of SCR's–1, 1'; and this same action will be repeated in unit II through phase winding legs BC, and in unit III through the phase legs AC, repetitiously in each cycle.

The firing of the SCR's is achieved at critical angular positions in each cycle by triggering voltage pulses applied to the gate electrodes 37 and 37' in unit I, and corresponding gating electrodes 39, 39' and 40, 40', respectively, in units II and III, connected and operative in a manner identical to that just described for unit I.

Associated with each of the solid-state switching units I, II and III is a corresponding triggering and resetting means embodying a transistor circuit T–1 of known character and commercially available, the same being represented in FIG. 1 in block diagram form, the purpose of which is to provide from the A.C. line voltage a shaped, hard firing pulse in each phase for the corresponding SCR or other switching means to conduct the line voltage to a corresponding one of the motor phase legs at a certain instant during the phase.

Since each of the switching units I, II and III is adapted to full-wave performance, two pulses are required in each cycle for each phase, one for the positive-going portion of the cycle and the other for the negative-going portion; and in the embodiment of FIG. 1 the triggering means is divided for each half-cycle so that a pair of triggering and reset circuits in the blocks marked T–1, and T–1' is shown for phase I, and another pair T–2, T–2' is associated with unit II for phase 2, and still another pair T–3, T–3' is associated with unit III for phase 3.

Thus, SCR–1 in unit I has its gate or trigger electrode 37 and the relatively negative-going line terminal L–1 connected by conductors 51A and 51B to the input side of trigger and reset circuit means T–1 for control in the first half of the cycle, while the gate electrode 37' of the companion SCR–1' and the relatively-negatively going side of line terminal L–1 are connected by conductors 51C and 51D to the input side of the companion trigger and reset means T–1' for the other half cycle.

Similarly, the gating electrodes 39 and 39' and return circuits therefore to line terminals L–2 are connected respectively by conductors 52A, 52B to the input of T–2, and by conductors 52C and 52D to the input of the companion trigger and reset circuit T–2'; and the gating electrodes 40 and 40' for the SCR's of unit III connect respectively by conductors 53A, 53B to the input of triggering and reset circuit T–3, and by conductors 53C and 53D to the input of circuit T–3'.

It will be observed that each of the three triggering and reset sections T–1, T–1' . . . T–3, T–3' is connected to line voltage in a corresponding phase of the cycle, and the known circuitry utilized in each such triggering and resetting circuit is such as to derive a firing or triggering pulse for the appertaining SCR's from such line voltage through the use of magnetic amplifiers M–1, M–2 and M–3, each of which is common to one pair of triggering and resetting circuits.

Each magnetic amplifier includes a bias winding 61, 62 or 63 and a corresponding pair of trigger pulse windings 61A, 61B; 62A, 62B; and 63A, 63B, each pair of trigger pulse windings being connected into a corresponding one of the associated pair of triggering and resetting units. Thus, trigger pulse winding 61A connects into the trigger and reset circuit T–1, while the companion trigger winding 61B connects into the companion trigger and reset unit T–1', and similarly for the other two magnetic amplifiers M–2 and M–3, respectively associated with T–2, T–2' and T–3, T–3'.

The known operation and construction of the magnetic amplifiers is such that the windings are laid on saturable cores, the relative degree of saturation of which can be controlled by a D.C. current through the appertaining bias winding with the result that the A.C. line voltage, because it is progressively changing through maxima and minima in each half cycle, effectively induces a triggering pulse only at the time the changing A.C. voltage becomes such as to produce a flux change in the core against the effect of the bias current, and in a three-phase system such as described, the effective angular time is 60° for each phase during which the triggering pulse can occur, the particular instant being thus determined by the magnitude of the D.C. bias current at that instant.

In accordance with the disclosed method, the same D.C. bias is applied to all bias windings simultaneously under control of a single potentiometer, in the manner depicted in FIG. 1, wherein the potentiometer contactor or wiper 28 connects via conductor 50 to bias winding 61 and through the latter via conductor 50A to bias winding 62 and through the latter via conductor 50B to bias winding 63 returned to ground G to simplify the circuitry for a return circuit to ground G at the D.C. power supply 29. It will thus be apparent that the potentiometer wiper 28 moving across the resistance element 27 can vary the current through all three bias windings simultaneously from the indicated voltage values of plus 13 volts to minus 10 volts, which happens to be the voltage values employed in one form of the apparatus.

The operation of the system as depicted and described in view of FIG. 1 is such that, assuming the pressure sensing means 21 to be set for some predetermined pressure to be maintained in the line 16 by the pump 10 driven by the multiphase working or load motor 11, and assuming further that the motor is running and the pressure is at the level required, the condition-responsive switch means 22 will be in an open-circuit condition and the potentiometer motor 25 will be at rest.

Should the line pressure now vary up or down from the predetermined pressure required, the change will be sensed by the means 21 and cause movement of the contact means 22A through the agency of a coupling 21A to engage one or the other of the contacts 22B or 22C with a consequent energization of one or the other of the directional windings 25A or 25B of the potentiometer or servo-motor, depending upon the character, rising or falling, of the pressure change signalled.

The potentiometer motor 25 starts from a condition of rest because the contacts 22A are positioned by the sensing means in between the reversing contacts 22B, 22C so long as the pressure in the liquid line is at the required level, and this is tantamount to saying that the working motor 11 has been running, prior to the signalled change, at some particular speed determined by the bias produced by whatever position the potentiometer wiper happens to occupy in the resting condition of the servo-motor, and at the time a change in torque or speed is signalled, whether up or down, the potentiometer wiper 28 simply shifts position to effect an appropriate change in the D.C. bias to the magnetic amplifiers. When the line pressure is restored as a result of such action by the bias control means, the movable sensing contact means 22A will be positioned by the sensing device 21 in an open-circuit relation to the stationary reversing contacts 22B, 22C and stop potentiometer motor 25, leaving the wiper contact 28 at rest until a further adjustment is signalled.

For satisfactory operation, the three-phase motor 11 should have about 8 to 13 percent slip to eliminate flywheel effects and overheating. The system is applicable to other multiphase configurations such as a delta, star, or a six-wire system, six units like units I, II and III with corresponding cooperative triggering and reset pairs like T–1, T–1', etc. would be required.

The silicon controlled rectifier is a very satisfactory form of triggerable solid-state switching means by reason of its relatively low cost and high current carrying capacity required for motors of 5 to 25 H.P. such as are commonly employed in liquid delivery systems of the type described.

Figure 2:
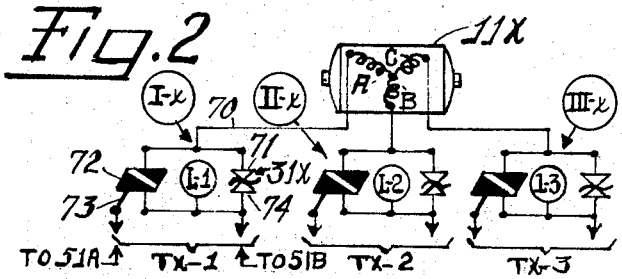
FIG. 2 is a circuit detail of a modified form of the solid-state switching means employing a single solid-state switching means such as a triac for full-wave operation in each phase leg under control of the null biasing means.

FIG. 2 depicts a modified solid-state switching means of simplified but currently more costly character which may be substituted for that shown in FIG. 1, wherein the working motor 11X has its three phase legs A, B and C each connecting into a corresponding one of three identical solid state switching units I–x, II–x and III–x respectively connecting to line terminals L–1, L–2, L–3 of a three-phase system.

Considering the first unit I–x for phase 1 (φAB), the motor winding A connects via conductor 70 to one anode 71 of a Zener type suppressor 31X and also to one anode of a bi-directional triggering type of solid state switching device 72, such as a triac, which can be triggered by a single gating electrode to conduct in either direction, so that only one such switching device is required for each phase leg.

The trigger electrode 73 of the triac and remaining anode 74 of the suppressor are connected into the input of a single trigger and reset unit TX–1 (identical to T–1), all of the companion triggering and reset units such as T–1' being eliminated, since a single triac is inherently capable of performing in full-wave operation in each phase control unit. Thus, by use of triacs as shown, the three companion half-wave triggering and resetting units T–1', T–2', T–3' can be eliminated along with the need for the corresponding trigger windings 61B, 62B and 63B of the magnetic amplifiers, and the trigger or gate electrode 73 and line terminal L–1 can be connected as to the conductors 51A and 51B in FIG. 1 when the triac unit L–x is substituted for the SCR unit I, as aforesaid. The same kinds of change in connections are made in replacing units II and III by triac units II–x and III–x, no change being required in the D.C. biasing circuitry or operation, except that the second trigger windings 61B, 62B and 63B in the magnetic amplifiers become superfluous and can be eliminated to lower costs.

The servo-motor 25 may be a very small 6-volt D.C. motor which is shown as energized from a battery source B merely to emphasize the D.C. character and desirability, but not mandatory use of a D.C. source separate from the supply 29 to eliminate the need for critical regulation of the latter if the loading effect of motor 25 is intermittently applied to the bias supply 29. Any suitable reversing motor may serve the purpose of motor 25, the separate reverse winding type being shown for simplicity.

We claim:

1. In a load-responsive control circuit for a multiphase working motor employing triggerable solid-state switching devices for each phase leg of the motor and respectively fired by trigger pulses derived from a corresponding magnetic amplifier having a trigger winding and also a bias winding which is energized by variable D.C. bias current the magnitude of which determines the angular time in each phase at which the trigger pulse can occur, improvements in bias control means comprising, namely: a source of D.C. bias current and variable potentiometer means connected therewith for selectively varying said bias current simultaneously through the totality of bias windings in equal magnitude therein for said magnetic amplifiers; servo-motor means drivingly interconnecting with said potentiometer means to vary the same at a slow rate; sensor switch means operative to start and stop said servo-motor means; and load-responsive sensing means having driving interconnection with said switch means to actuate the same in starting and stopping operation of the servo-motor means as aforesaid, said sensing means being arranged and constructed to respond to changes in loading on the working motor from a predetermined condition, and to actuate the potentiometer means in response to changes in loading from said condition to modify the bias current aforesaid and thereby change the angular time in each phase of each cycle in which the respective phase legs of the working motor will be energized by said solid-state switching devices.

2. Apparatus according to claim 1 wherein said triggerable switching devices comprise silicon controlled rectifiers (SCR) in series with driving power to respective motor legs, and each having gate electrode means to which the trigger pulses are applied as aforesaid to trigger the SCR's into the conductive state at angular times in each phase of the cycle determined by the bias current as aforesaid.

3. Apparatus according to claim 1 wherein the load on said working motor comprises a liquid pumping means delivering liquid into a line; said sensing means comprises a pressure responsive device connecting with said line, said sensor switch means being actuated thereby to connect and disconnect power to the servo-motor means as aforesaid responsive to pressure variations in the line; and said servo-motor means displaces a potentiometer-varying wiper contact at a rate which is commensurate with a slow speed of the order of about ½ r.p.m.

4. Apparatus according to claim 2 wherein said working motor is a three-phase motor including a phase winding for each phase, and the appertaining SCR means for each said phase winding is of a character operable to connect full-wave line voltage thereto responsive to triggering of such appertaining SCR means in each phase of each line voltage cycle.

5. Control means according to the combination of claim 1 wherein the potentiometer means comprises a resistance element traversed by a wiper contact driven by said servo-motor at a slow rate of the order of approximately 1 r.p.m., and said resistance element and wiper contact are connected in series with said D.C. supply and said bias windings.

6. The control means according to the combination of claim 1 wherein said working motor is a three-phase motor having three phase legs, wherein said triggerable switching devices are of the class of unidirectionally conductive silicon controlled rectifiers (SCR) each having a gating electrode connected for firing by an appertaining one of said trigger windings under control of current through a corresponding bias winding, and each having an anode and a cathode in series with one of said phase windings and rendered conductive responsive to trigger pulses applied to the gating electrodes thereof as aforesaid, there being at least two such SCR devices connected in series with power to the appertaining phase winding for respectively reverse conduction to provide full-wave energization for the respective phase windings.

7. Control means according to the combination of claim 1 wherein said triggerable switching devices comprise a bi-directionally conductive solid-state electron gating devices each in series with power to one of said motor legs and each having a single trigger electrode to fire the conductivity thereof in either direction, the said electrodes being respectively connected with corresponding trigger circuit means operative to apply a trigger pulse thereto in the appertaining phase of each line voltage cycle under control of said bias current.

8. In combination with a three-phase working motor adapted to drive a varying load and having a winding leg for each phase; at least one triggerable conduction device in series with phasal power to each said winding leg; a source of trigger pulses for each said conduction device, said sources each including a saturable type magnetic amplifier for each power phase and each amplifier having at least a bias winding for saturation control and a trigger-pulse winding connecting in a trigger circuit with a trigger electrode for a corresponding one of said conduction devices; a source of D.C. bias current and means connecting the same through resistance varying means including a movable resistance changing member, with all of said bias windings in a series relation; sensor means for sensing variations in the load on said working motor; a second motor means driving said movable resistance changing member to vary the bias current aforesaid; and sensor switch means actuated by said sensor means to start and stop said second motor means responsive to certain sensed load variations whereby to control the triggering of said conduction devices as a function of simultaneous change in bias current through all of said bias windings.

References Cited
UNITED STATES PATENTS

| | | | |
|---|---|---|---|
| 3,109,976 | 11/1963 | Sichling. | |
| 3,189,810 | 6/1965 | MacGregor | 318—227 |
| 3,431,475 | 3/1969 | Wesner | 318—227 XR |
| 3,434,586 | 3/1969 | Morris | 318—227 XR |

BENJAMIN DOBECK, Primary Examiner

G. Z. RUBINSON, Assistant Examiner

U.S. Cl. X.R.
318—335, 345